United States Patent
Owsik et al.

(10) Patent No.: US 10,072,217 B2
(45) Date of Patent: Sep. 11, 2018

(54) REVERSE EMULSION BREAKER POLYMERS

(71) Applicant: Ecolab USA Inc., St. Paul, MN (US)

(72) Inventors: Izabela A. Owsik, College Station, TX (US); Virgil T. Little, Rosenberg, TX (US)

(73) Assignee: Ecolab USA Inc., St. Paul, MN (US)

( * ) Notice: Subject to any disclaimer, the term of this patent is extended or adjusted under 35 U.S.C. 154(b) by 84 days.

(21) Appl. No.: 15/058,786

(22) Filed: Mar. 2, 2016

(65) Prior Publication Data

US 2016/0257892 A1 Sep. 8, 2016

Related U.S. Application Data

(60) Provisional application No. 62/128,326, filed on Mar. 4, 2015.

(51) Int. Cl.
| | | |
|---|---|---|
| *C08G 18/08* | (2006.01) | |
| *C10G 33/04* | (2006.01) | |
| *B01D 17/04* | (2006.01) | |

(52) U.S. Cl.
CPC ........... *C10G 33/04* (2013.01); *B01D 17/047* (2013.01)

(58) Field of Classification Search
CPC ...... C10G 33/04; C10G 33/00; B01D 17/047; C02F 1/56
See application file for complete search history.

(56) References Cited

U.S. PATENT DOCUMENTS

| | | | | |
|---|---|---|---|---|
| 2,130,947 A | * | 9/1938 | Carothers | ............... C07C 55/14 528/335 |
| 2,407,895 A | * | 9/1946 | Jenkins | .................. C08G 65/34 516/180 |
| 3,594,393 A | | 7/1971 | Buriks et al. | |
| 3,668,129 A | | 6/1972 | Willett | |
| 3,734,889 A | | 5/1973 | Lipowski et al. | |
| 3,993,615 A | * | 11/1976 | Markofsky | .......... B01D 17/047 524/770 |
| 4,038,296 A | | 7/1977 | Greif et al. | |

(Continued)

FOREIGN PATENT DOCUMENTS

| | | |
|---|---|---|
| CN | 103788289 A | 5/2014 |
| EP | 0 377 313 A2 | 7/1990 |

(Continued)

OTHER PUBLICATIONS

Nguyen, D., et al., "Effect of Diluents and Asphaltenes on Interfacial Properties and Steam-Assisted Gravity Drainage Emulsion Stability: Interfacial Rheology and Wettability," Energy & Fuels, 2014, pp. 1641-1651, vol. 25.

(Continued)

*Primary Examiner* — Michael A Salvitti
(74) *Attorney, Agent, or Firm* — Senniger Powers LLP

(57) ABSTRACT

The present invention generally relates to methods for resolving water and oil emulsions in the produced fluid of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

20 Claims, 1 Drawing Sheet

(56) References Cited

U.S. PATENT DOCUMENTS

| | | | |
|---|---|---|---|
| 4,098,692 A | | 7/1978 | Baker et al. |
| 4,179,396 A | * | 12/1979 | Gabel ................. B01D 17/047 516/142 |
| 4,183,821 A | | 1/1980 | Langdon et al. |
| 4,202,957 A | | 5/1980 | Bonk et al. |
| 4,238,330 A | * | 12/1980 | Fong ................. B01D 17/0205 210/708 |
| 4,247,476 A | * | 1/1981 | Haase ................. A01N 37/30 210/729 |
| 4,303,780 A | * | 12/1981 | Bellos ................. B01D 17/047 210/705 |
| 4,440,902 A | | 4/1984 | Diery et al. |
| 4,448,708 A | * | 5/1984 | Killat ................. B01D 17/047 516/172 |
| 4,500,735 A | * | 2/1985 | Diery ................. B01D 17/047 508/547 |
| 4,505,839 A | * | 3/1985 | Bellos ................. B01D 17/047 516/174 |
| 4,731,481 A | * | 3/1988 | Bellos ................. B01D 17/047 516/161 |
| 4,741,835 A | | 5/1988 | Jacques et al. |
| 4,762,899 A | | 8/1988 | Shikinami |
| 4,981,936 A | | 1/1991 | Good, Jr. et al. |
| 5,032,285 A | * | 7/1991 | Braden ................. B01D 17/047 210/708 |
| 5,153,259 A | | 10/1992 | Padget et al. |
| 5,371,131 A | | 12/1994 | Gierenz et al. |
| 5,643,460 A | * | 7/1997 | Marble ................. B01D 17/047 166/267 |
| 5,873,911 A | * | 2/1999 | Danner ................. C08G 71/02 252/8.86 |
| 5,921,912 A | * | 7/1999 | Hart ................. B01D 17/047 210/708 |
| 5,936,045 A | | 8/1999 | Warzelhan et al. |
| 6,399,735 B1 | | 6/2002 | Fischer et al. |
| 6,787,628 B2 | | 9/2004 | Thetford et al. |
| 7,041,707 B2 | | 5/2006 | Hahn |
| 7,645,725 B2 | | 1/2010 | Weaver et al. |
| 7,994,112 B2 | | 8/2011 | Vanpachtenbeke et al. |
| 8,129,326 B2 | * | 3/2012 | Misske ................. C08G 73/024 510/356 |
| 8,530,597 B2 | | 9/2013 | Kurian et al. |
| 8,802,740 B2 | | 8/2014 | Newman et al. |
| 9,260,545 B1 | * | 2/2016 | Squicciarini ......... C08F 220/54 |
| 2004/0147407 A1 | | 7/2004 | Hahn |
| 2004/0176537 A1 | | 9/2004 | Armentrout et al. |
| 2006/0237372 A1 | * | 10/2006 | Arciszewski ...... B01D 17/0217 210/708 |
| 2008/0318812 A1 | * | 12/2008 | Kakadjian, Sr. ........ C09K 8/035 507/221 |
| 2009/0306232 A1 | * | 12/2009 | Williams ............. B01D 17/047 516/140 |
| 2010/0234631 A1 | * | 9/2010 | Misske ................. C08G 73/024 558/27 |
| 2011/0011806 A1 | * | 1/2011 | Ebert ................. B01D 17/047 210/708 |
| 2011/0147306 A1 | | 6/2011 | Polizzotti et al. |
| 2011/0253598 A1 | * | 10/2011 | McDaniel ........... B01D 17/047 208/188 |
| 2011/0253599 A1 | | 10/2011 | Cross et al. |
| 2012/0000657 A1 | * | 1/2012 | Dalmazzone ........... C09K 8/36 166/304 |
| 2012/0130037 A1 | | 5/2012 | Querci et al. |
| 2012/0171301 A1 | | 7/2012 | Koenig et al. |
| 2013/0072405 A1 | * | 3/2013 | Favero ................. C09K 8/12 507/225 |
| 2015/0096750 A1 | * | 4/2015 | Loiseau ................. C09K 8/36 166/280.2 |
| 2015/0307788 A1 | * | 10/2015 | McDaniel .............. C10G 33/04 524/105 |
| 2015/0361350 A1 | * | 12/2015 | Prasad ................. G05D 7/0676 700/285 |
| 2016/0257891 A1 | * | 9/2016 | Little ................. C10G 33/04 |
| 2016/0257892 A1 | * | 9/2016 | Owsik ................. C10G 33/04 |
| 2016/0311940 A1 | * | 10/2016 | Hund ................. C08F 8/00 |
| 2016/0369170 A1 | * | 12/2016 | Balsamo De Hernandez ............ C10G 33/04 |
| 2017/0066881 A1 | * | 3/2017 | Rose ................. C08G 73/024 |

FOREIGN PATENT DOCUMENTS

| | | |
|---|---|---|
| EP | 0429892 A2 | 6/1991 |
| EP | 0 824 156 A1 | 8/1997 |
| WO | 02/38645 A1 | 5/2002 |
| WO | 2004/067594 A2 | 8/2004 |
| WO | 2008/031781 A2 | 3/2008 |
| WO | 2011/032640 A2 | 3/2011 |

OTHER PUBLICATIONS

Schmalz et al. "Morphology, Surface Structure, and Elastic Properties of PBT-Based Copolyesters with PEO-b-PEB-b-PEO triblock Copolymer Soft Segments", Macromolecules 2002, 35, 5491-5499 (published on the web—Jun. 6, 2002).

Kuwamura et al., Surface active block copolymers: I. The preparation and some surface active properties of block copolymers of tetrahydrofuran and ethylene oxide, Journal of the American Oil Chemists' Society, vol. 48, Issue 1, Jan. 1971, pp. 29-34.

Becker J.R., Crude Oil Waxes, Emulsions, and Asphaltenes. Tulsa, Oklahoma: Penn Well Publishing Company, ISBN 0-87814-737-3, Dec. 31, 1997, pp. 3, 84-85, Fig. 5-1.

International Search Report dated Jun. 8, 2016 in related PCT Application No. PCT/US2016/020439, 3 pages.

Written Opinion dated Jun. 8, 2016 in related PCT Application No. PCT/US2016/020439, 6 pages.

International Search Report and Written Opinion dated Jun. 14, 2016 in related PCT Application No. PCT/US2016/020248, 11 pages.

* cited by examiner

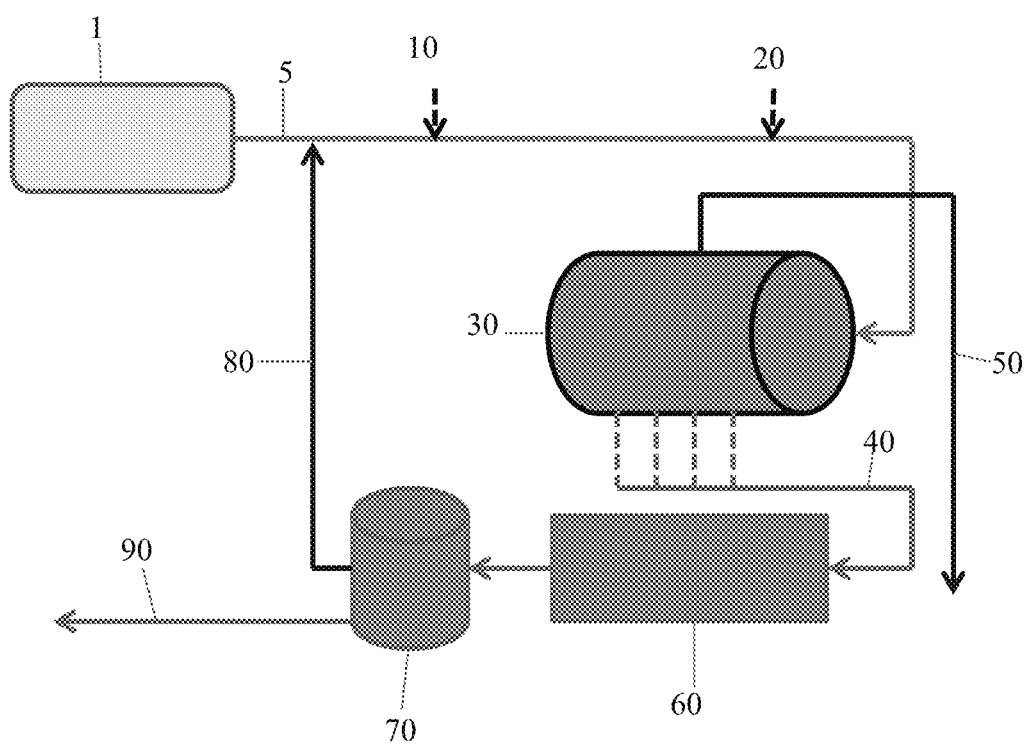

REVERSE EMULSION BREAKER POLYMERS

CROSS-REFERENCE TO RELATED APPLICATION

This application claims priority to U.S. Provisional Patent Application Ser. No. 62/128,326 filed on Mar. 4, 2015, the disclosure of which is incorporated herein by reference in its entirety.

FIELD OF THE INVENTION

The present invention generally relates to methods for resolving water and oil emulsions as the produced fluids of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

BACKGROUND OF THE INVENTION

Oil-in-water and water-in-oil-in-water emulsions can occur in many industrial systems. For example, these emulsions are a problem in many energy extraction systems because the produced fluids contain oil and solids dispersed in the produced water and separation of the oil and solids from the water is needed to comply with the oil sales specifications and to provide acceptable specifications before the water can be disposed or re-used.

In particular, oil-in-water and water-in-oil-in-water emulsions can be problems in produced fluid (steam assisted gravity drainage (SAGD), steam flood, etc.) separation processes where the oil and solids in the produced fluid are separated from the produced water in the produced fluid.

For example, SAGD operations inject steam into geological formations to stimulate the production of bitumen or heavy hydrocarbon. Oil sands deposits in Alberta, Canada represent an area where this process is extensively used. Pairs of horizontal wells are bored into the oil-containing formation. The upper well injects steam and the lower well which is positioned below the steam injection line, continuously extracts a complex emulsion. That emulsion contains bitumen and water. The emulsion is broken; the bitumen is sent for upgrading/refining, while the produced water (separated from the emulsion) is treated and reused as feedwater for the steam generators.

SUMMARY OF THE INVENTION

One aspect of the invention is a method of resolving a reverse emulsion in produced fluid of an oil production system comprising adding a reverse emulsion breaker to the produced fluid of the crude oil production system in an amount effective for resolving the reverse emulsion, wherein the reverse emulsion breaker is a polyquaternary ammonium salt. The polyquaternary ammonium salt comprises the reaction product of contacting a poly(triethanolamine) with an alkylating agent. The alkylating agent comprising a $C_1$-$C_{12}$ alkyl halide, a $C_1$-$C_{12}$ haloalkanol, a halo-substituted ammonium salt, an aryl halide, an alkaryl halide, an alkylene oxide under acidic conditions, or a combination thereof.

Another aspect of the invention is a composition for resolving a reverse emulsion in produced fluid of an oil production system comprising an effective amount of a reverse emulsion breaker and an effective amount of an emulsion breaker, the reverse emulsion breaker comprising a polyquaternary ammonium salt. The polyquaternary ammonium salt comprising the reaction product of contacting a poly(triethanolamine) with an alkylating agent. The alkylating agent comprising a $C_1$-$C_{12}$ alkyl halide, a $C_1$-$C_{12}$ haloalkanol, a halo-substituted ammonium salt, an aryl halide, an alkaryl halide, an alkylene oxide under acidic conditions, or a combination thereof.

Other objects and features will be in part apparent and in part pointed out hereinafter.

BRIEF DESCRIPTION OF THE DRAWINGS

FIG. 1 is a schematic of a separation system to separate solids, oil, and water in an emulsified hydrocarbon fluid.

Corresponding reference characters indicate corresponding parts throughout the drawings.

DESCRIPTION OF THE PREFERRED EMBODIMENTS

The present invention is directed to methods for the improved separation of water and oil in oil production and processing operations. The method of the present invention comprises treating a system containing oil and water, where emulsions form, with a polyquaternary ammonium salt solution. The polyquaternary ammonium-containing treatments of the present invention were found to be effective treatments for resolving (breaking or inhibiting) oil-in-water (reverse) and water-in-oil-in-water emulsions in petroleum processes. Particularly, these reverse emulsion breakers are effective for improving the water quality in steam-assisted gravity drainage (SAGD) processes. The reverse emulsion breakers disclosed herein are also typically water-soluble.

One aspect of the invention is a method of resolving a reverse emulsion in produced fluid of an oil production system comprising adding a reverse emulsion breaker to the produced fluid of the crude oil production system in an amount effective for resolving the reverse emulsion, wherein the reverse emulsion breaker is a polyquaternary ammonium salt; the polyquaternary ammonium salt being the reaction product of contacting a poly(triethanolamine) with an alkylating agent, the alkylating agent being a $C_1$-$C_{12}$ alkyl halide, a $C_1$-$C_{12}$ haloalkanol, a halo-substituted ammonium salt, an aryl halide, an alkaryl halide, an alkylene oxide under acidic conditions, or a combination thereof.

Further, the invention is directed to a composition for resolving a reverse emulsion in produced fluid of an oil production system comprising an effective amount of a reverse emulsion breaker and an effective amount of an emulsion breaker, the reverse emulsion breaker being a polyquaternary ammonium salt, the polyquaternary ammonium salt being the reaction product of contacting a poly (triethanolamine) with an alkylating agent, the alkylating agent being a $C_1$-$C_{12}$ alkyl halide, a $C_1$-$C_{12}$ haloalkanol, a halo-substituted ammonium salt, an aryl halide, an alkaryl halide, an alkylene oxide under acidic conditions, or a combination thereof.

For the methods and compositions herein, the alkylating agent can be 2-chloroethanol, ethyl chloride, propyl chloride, butyl chloride, glycidyl trimethylammonium chloride, 3-chloro-2-hydroxypropyltrimethylammonium chloride, benzyl chloride, or a combination thereof.

For the methods and compositions herein, the alkylene oxide is ethylene oxide, propylene oxide, butylene oxide, or a combination thereof and inorganic acid results in acidic conditions.

For the methods and compositions herein, the polyquaternary ammonium salt can comprise the reaction product of contacting a poly(triethanolamine) with ethylene oxide and an inorganic acid.

For the methods and compositions herein, the polyquaternary ammonium salt can comprise the reaction product of contacting a poly(triethanolamine) with 2-chloroethanol.

For the methods and compositions herein, the polyquaternary ammonium salt can comprise the reaction product of contacting a poly(triethanolamine) with 3-chloro-2-hydroxypropyltrimethylammonium chloride.

For the methods and compositions herein, the polyquaternary ammonium salt can comprise the reaction product of contacting a poly(triethanolamine) with benzyl chloride.

For the methods of resolving a reverse emulsion, the reverse emulsion can be a water-in-oil-in-water emulsion.

For the methods and compositions herein, the molecular weight of the polyquaternary ammonium salt can be from about 200 Daltons to about 200,000 Daltons, from about 200 Daltons to about 100,000 Daltons, from about 200 Daltons to about 50,000 Daltons, from about 1,000 Daltons to about 200,000 Daltons, from about 1,000 Daltons to about 100,000 Daltons, from about 1,000 Daltons to about 50,000 Daltons, or from about 1,000 Daltons to about 20,000 Daltons. Preferably, the molecular weight of the polyquaternary ammonium salt can be from about 2,000 Daltons to about 20,000 Daltons.

For the methods and compositions herein, the reverse emulsion breaker is water-soluble.

For the methods and compositions herein, the effective amount of the reverse emulsion breaker can be from about 2 ppm to about 200 ppm, from about 2 ppm to about 150 ppm, from about 2 ppm to about 100 ppm, from about 10 ppm to about 200 ppm, or from about 10 ppm to about 100 ppm, based on the total volume of the produced fluid. Preferably, the effective amount of the reverse emulsion breaker is from about 20 ppm to about 75 ppm based on the total volume of the produced fluid.

The methods and compositions can further comprise adding an emulsion breaker to the produced fluid of the oil production system.

When the methods and compositions comprise an emulsion breaker, the emulsion breaker can comprise an oxyalkylated phenol-formaldehyde resin, a resin ester, an oxyalkylated polyalkylamine, a polyol, a cross-linked polyol with a di- or multi-functional cross-linker, an isocyanate, an acid, or a combination thereof. Preferably, the emulsion breaker comprises a polyol and resin blend.

When the reverse emulsion breaker is used to break an emulsion in an oil production system, the emulsion can be in the produced fluid from a steam-assisted gravity drainage production system or a cyclic steam stimulation system. Preferably, when the reverse emulsion breaker is used to break an emulsion in an oil production system, the produced fluid is from a steam-assisted gravity drainage production system.

In some instances, the emulsion breaker and the reverse emulsion breaker have a synergistic effect for resolving the water-in-oil-in-water emulsion in the produced fluid of an oil production system.

The emulsion breaker can have a concentration from about 100 ppm to about 500 ppm, from about 100 ppm to about 400 ppm, from about 100 ppm to about 300 ppm, or from about 100 ppm to about 200 ppm.

A diluent can be added to the production system and the diluent can be condensate, naphtha, kerosene, light crude oil, or a combination thereof.

The reverse emulsion breaker can be prepared in modification of polytriethanolamine using various alkyl halides, aryl halides, and the like.

The reverse emulsion breaker can be also prepared in reaction of polytriethanolamine with ethylene oxide under acidic conditions.

The reverse emulsion breaker can be dissolved in a solvent. The solvent can be water, methanol, ethylene glycol, propylene glycol.

The reverse emulsion breakers of the present invention are preferably added to the inlet emulsion to a water and oil separating system. The water and oil separating system is depicted in FIG. 1 and comprises a production well 1 that produced a produced fluid carried in a produced fluid line 5. To the produced fluid line 5 can be added an emulsion breaker, a reverse emulsion breaker, or a combination thereof at injection point 10. When the reverse emulsion breaker is combined with the optional emulsion breaker, they can be injected independently, simultaneously, or sequentially. Further, a diluent can be injected at injection point 20. The produced fluid is then sent to one or more separation vessels 30. The separation vessels can be a free water knock out (FWKO) vessel, a heat treater, or a phase separator. The produced water from the separation vessel(s) is carried in a produced water line 40 to a flotation tank 60. The produced water from the flotation tank 60 is sent to a skim tank 70 where the bottoms are sent to a produced water tank through the produced water tank line 90 and recycled oil is skimmed from the surface of the liquid in the skim tank 70 and sent back to the produced fluid line 5 through the recycled oil line 80. The tops from the separation vessels are sent to the oil tank through the oil line 50.

The efficacy of the polyquaternary ammonium reverse emulsion breakers is dependent upon a number of factors such as water drop, water quality, interface quality, oil dryness, and the like.

Emulsion stability is monitored by measuring phase separation at about 90° C. to about 150° C. using conventional bottle testing. The produced emulsion (100 mL) is poured in a 6 ounce prescription glass bottle and heated for approximately 30 to 60 minutes at about 90° C. to about 150° C. in a water bath. A diluent is added to the emulsion and mixed using a mechanical shaker at low speed for five minutes or mixed by shaking the bottle by hand. In some tests the mixed emulsion is placed back in the water bath at about 90° C. to about 150° C.; in other cases the next step is injection. The reverse emulsion breaker (REB), and optionally emulsion breaker (EB) and are injected at a designated dose, hand-shaken for 100 cycles (or in a shaker at low setting for 1 minute), and placed in the water bath at 90° C. for observation of water drop during 60-120 minutes. Basic sediments and water (BS&W) are determined by diluting 6 mL of the oil close to the interface with 6 mL xylene, toluene, or mineral spirits (e.g., Varsol™) and centrifuging for five minutes. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU.

Having described the invention in detail, it will be apparent that modifications and variations are possible without departing from the scope of the invention defined in the appended claims.

EXAMPLES

The following non-limiting examples are provided to further illustrate the present invention.

Example 1: Reaction of Polytriethanolamine with Ethylene Oxide

Polytriethanolamine (600 grams) was placed in a glass bottle. Then, hydrochloric acid (550.0 grams, 36-38 wt. % in water) was added portionwise to bring the pH to less than 4. When the pH was stabilized, the sample was transferred to an autoclave and a gradual addition of ethylene oxide (mEO=240 g) at ambient temperature was started. The reaction was exothermic. After the addition was finalized, the reaction mixture was kept stirring for 10-16 hours at ambient temperature. The final product was transferred to a bottle and analyzed. Product 1 was prepared as above and Product 2 was prepared as described using 331.92 g polytriethanolamine and 180 g ethylene oxide.

Example 2: Polytriethanolamine Modified with 2-Chloroethanol

Polytriethanolamine (250.94 gram) was placed in the round bottom flask and heated to 200° F. (93.3° C.). Then, 142.55 grams of 2-chloroethanol was added and the reaction mixture was heated to 200° F. (93.3° C.) and kept at this temperature for 3 hours. Then, 43.43 grams of water was added and the reaction mixture was kept at 200° F. (93.3° C.) for about 20 hours. The final product was transferred to a bottle and submitted for analysis (expected Cl %: 14.39%).

Example 3: Modification of pTEA with 3-chloro-2-hydroxypropyltrimethylammonium chloride Modification of polytriethanolamine (pTEA) was performed as described in Example 2. The reaction temperature was set up at 200° F. (93.3° C.) and water was used as a solvent. The ratio of 3-chloro-2-hydroxypropyltrimethylammonium chloride to amine concentration of pTEA was varied from 1:4 to 1:1.

Example 4: Modification of pTEA with Benzyl Chloride

Modification of polytriethanolamine was again performed as described in Example 2. The reaction temperature was set up at 200° F. (93.3° C.) and water was used as a solvent. The ratio of benzyl chloride to amine concentration of pTEA was varied from 1:4 to 1:1.

Example 5: REB Test Results

Emulsion stability was monitored by measuring phase separation at about 90° C. using conventional bottle testing. The produced emulsion (100 mL) was poured in a 6 ounce prescription glass bottle and heated for approximately 30 to 60 minutes at about 90° C. in a water bath. A diluent was added to the emulsion and mixed using a mechanical shaker at low speed for five minutes or mixed by shaking the bottle by hand. In some tests the mixed emulsion was placed back in the water bath at 90° C. and in other cases the next step was injection of the reverse emulsion breaker and optionally, the emulsion breaker into the emulsion. The flow sheet of the production plant that is being mimicked determines whether the emulsion was placed back into the water bath or if the reverse emulsion breaker, and optionally, the emulsion breaker were injected into the emulsion. An emulsion breaker (EB) and a reverse emulsion breaker (REB) were injected by syringe at a designated dose, shook by hand for 100 cycles, and placed in the water bath at 90° C. for observation during 60-120 minutes. Basic sediments and water (BS&W) were determined by diluting 6 mL of the oil close to the interface with 6 mL xylene, toluene, or mineral spirits (e.g., Varsol™) and centrifuging for five minutes. Water quality (WQ) was ranked on a comparative visual scale from 11 (partially broken reverse) to a 1 (≤50 NTU). A rating of 9 could be deemed equivalent to 1500 NTU, while a rating of 4 or 5 would be equal to about 500 NTU. Water drop (WD) was measured a 5, 15, 30, 45, and 60 minutes. The emulsion breaker used was commercially available from Nalco Champion in Sugarland, Tex. as EC2512A and used at 350 ppm for the 90 ppm REB concentrations and at 380 ppm for the 100 ppm and 150 ppm REB concentrations.

| REB | ppm | % Solvent | WD (5 min) | WD (15 min) | WD (30 min) | WD (45 min) | WD (60 min) | WQ |
|---|---|---|---|---|---|---|---|---|
| Product 1 | 90 | 25.0% | 35 | 50 | 50 | 50 | 50 | 11 |
|  | 100 | 25.0% | 30 | 50 | 65 | 70 | 72 | 5 |
|  | 150 | 25.0% | 40 | 60 | 80 | 80 | 82 | 5 |
| Product 2 | 90 | 25.0% | 30 | 40 | 40 | 40 | 40 | 11 |
|  | 100 | 25.0% | 60 | 70 | 75 | 76 | 75 | 5 |
|  | 150 | 25.0% | 20 | 30 | 60 | 68 | 68 | 5 |

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method of breaking a reverse emulsion in produced fluid of an oil production system comprising adding a reverse emulsion breaker to the produced fluid of the oil production system in an amount effective for breaking the reverse emulsion,
   wherein the reverse emulsion breaker is a polyquaternary ammonium salt;
   the polyquaternary ammonium salt being the reaction product of contacting a poly(triethanolamine) with an alkylating agent,
   the alkylating agent being a $C_1$-$C_{12}$ haloalkanol, a halo-substituted ammonium salt, an aryl halide, an alkaryl halide, an alkylene oxide under acidic conditions, or a combination thereof.

2. A method of breaking a reverse emulsion in produced fluid of an oil production system comprising adding a reverse emulsion breaker to the produced fluid of the oil production system in an amount effective for breaking the reverse emulsion, wherein the reverse emulsion breaker is a polyquaternary ammonium salt;
the polyquaternary ammonium salt being the reaction product of contacting a poly(triethanolamine) with an alkylating agent,
wherein the alkylating agent is 2-chloroethanol, 3-chloro-2-hydroxypropyltrimethylammonium chloride, benzyl chloride, or a combination thereof.

3. The method of claim 1 wherein the alkylating agent is the alkylene oxide and the alkylene oxide is ethylene oxide, propylene oxide, butylene oxide, or a combination thereof and an inorganic acid results in acidic conditions.

4. The method of claim 1 wherein the polyquaternary ammonium salt comprises the reaction product of contacting a poly(triethanolamine) with ethylene oxide and an inorganic acid.

5. A method of breaking a reverse emulsion in produced fluid of an oil production system comprising adding a reverse emulsion breaker to the produced fluid of the oil production system in an amount effective for breaking the reverse emulsion,
wherein the reverse emulsion breaker is a polyquaternary ammonium salt;
the polyquaternary ammonium salt being the reaction product of contacting a poly(triethanolamine) with an alkylating agent,
wherein the alkylating agent being a $C_1$-$C_{12}$ haloalkanol, a halo-substituted ammonium salt, an alkaryl halide, or a combination thereof.

6. The method of claim 5 wherein the polyquaternary ammonium salt comprises the reaction product of contacting a poly(triethanolamine) with 3-chloro-2-hydroxypropyltrimethylammonium chloride.

7. The method of claim 5 wherein the polyquaternary ammonium salt comprises the reaction product of contacting a poly(triethanolamine) with benzyl chloride.

8. The method of claim 1 wherein the reverse emulsion is a water-in-oil-in-water emulsion.

9. The method of claim 1, wherein the molecular weight of the polyquaternary ammonium salt is from about 200 to about 200,000 Daltons.

10. The method of claim 9, wherein the molecular weight of the polyquaternary ammonium salt is from about 2,000 to about 20,000 Daltons.

11. The method of claim 1 wherein the reverse emulsion breaker is water-soluble.

12. The method of claim 1 wherein the produced fluid of the oil production system is produced fluid from a steam-assisted gravity drainage production system or a cyclic steam stimulation system.

13. The method of claim 1 wherein the effective amount of the reverse emulsion breaker is from about 2 ppm to about 200 ppm based on the total volume of the produced fluid.

14. The method of claim 13 wherein the effective amount of the reverse emulsion breaker is from about 20 ppm to about 75 ppm based on the total volume of the produced fluid.

15. The method of claim 1 further comprising adding an emulsion breaker to the produced fluid of the oil production system.

16. The method of claim 15 wherein the emulsion breaker comprises an oxyalkylated phenol-formaldehyde resin, a resin ester, an oxyalkylated polyalkylamine, a polyol, a cross-linked polyol with a di- or multi-functional cross-linker, an isocyanate, an acid, or a combination thereof.

17. The method of claim 16 wherein the emulsion breaker comprises a polyol and resin blend.

18. The method of claim 5 wherein the polyquaternary ammonium salt comprises the reaction product of contacting a poly(triethanolamine) with 2-chloroethanol.

19. The method of claim 5, wherein the molecular weight of the polyquaternary ammonium salt is from about 2,000 to about 20,000 Daltons.

20. The method of claim 5 wherein the produced fluid of the oil production system is produced fluid from a steam-assisted gravity drainage production system or a cyclic steam stimulation system.

* * * * *